United States Patent [19]

Karstensen et al.

[11] 4,086,757
[45] May 2, 1978

[54] GAS TURBINE COOLING SYSTEM

[75] Inventors: Karl W. Karstensen; Edward G. Meints, both of Peoria, Ill.

[73] Assignee: Caterpillar Tractor Co., Peoria, Ill.

[21] Appl. No.: 729,746

[22] Filed: Oct. 6, 1976

[51] Int. Cl.² .......................................... F01D 25/12
[52] U.S. Cl. ............................ 60/39.16 R; 415/115; 415/116
[58] Field of Search .................. 60/39.16 R; 415/115, 415/116, 117, 139; 416/95, 96, 96 A, 97

[56] References Cited

U.S. PATENT DOCUMENTS

| | | | |
|---|---|---|---|
| 2,598,176 | 5/1952 | Johnstone | 415/116 |
| 2,962,256 | 11/1960 | Bishop | 415/136 |
| 3,540,810 | 11/1970 | Kercher | 416/96 A |
| 3,575,528 | 4/1971 | Beam et al. | 416/97 |
| 3,767,322 | 10/1973 | Durgin et al. | 416/96 |
| 3,768,924 | 10/1973 | Corsmeier et al. | 416/95 |
| 3,814,539 | 6/1974 | Klompas | 415/115 |
| 4,017,207 | 4/1977 | Bell et al. | 415/115 |

Primary Examiner—Carlton R. Croyle
Assistant Examiner—L. J. Casaregola
Attorney, Agent, or Firm—Phillips, Moore, Weissenberger, Lempio & Majestic

[57] ABSTRACT

A cooling system for a gas turbine engine having a gasifier turbine and a power turbine each interconnected by a turbine casing utilizes compressed cooling air communicated to axial cavities in the ends of the respective turbine shafts. This compressed air is directed outwardly between a flange integrally formed with the turbine shaft and the turbine wheel for communication to the turbine blades. In the gasifier turbine the cooling air passes through longitudinal passages formed in each blade, while in the power turbine the cooling air is discharged adjacent the blade root. Wheel flanges affixed on either side of the turbine wheel serve to retain the blades axially on the wheel. Compressed cooling air is also communicated to the nozzle vanes of the gasifier turbine wherein internal passages communicate the air into the main gas stream. Certain nozzle vanes are equipped with passage means to communicate air to an annular chamber surrounding the gasifier turbine.

14 Claims, 11 Drawing Figures

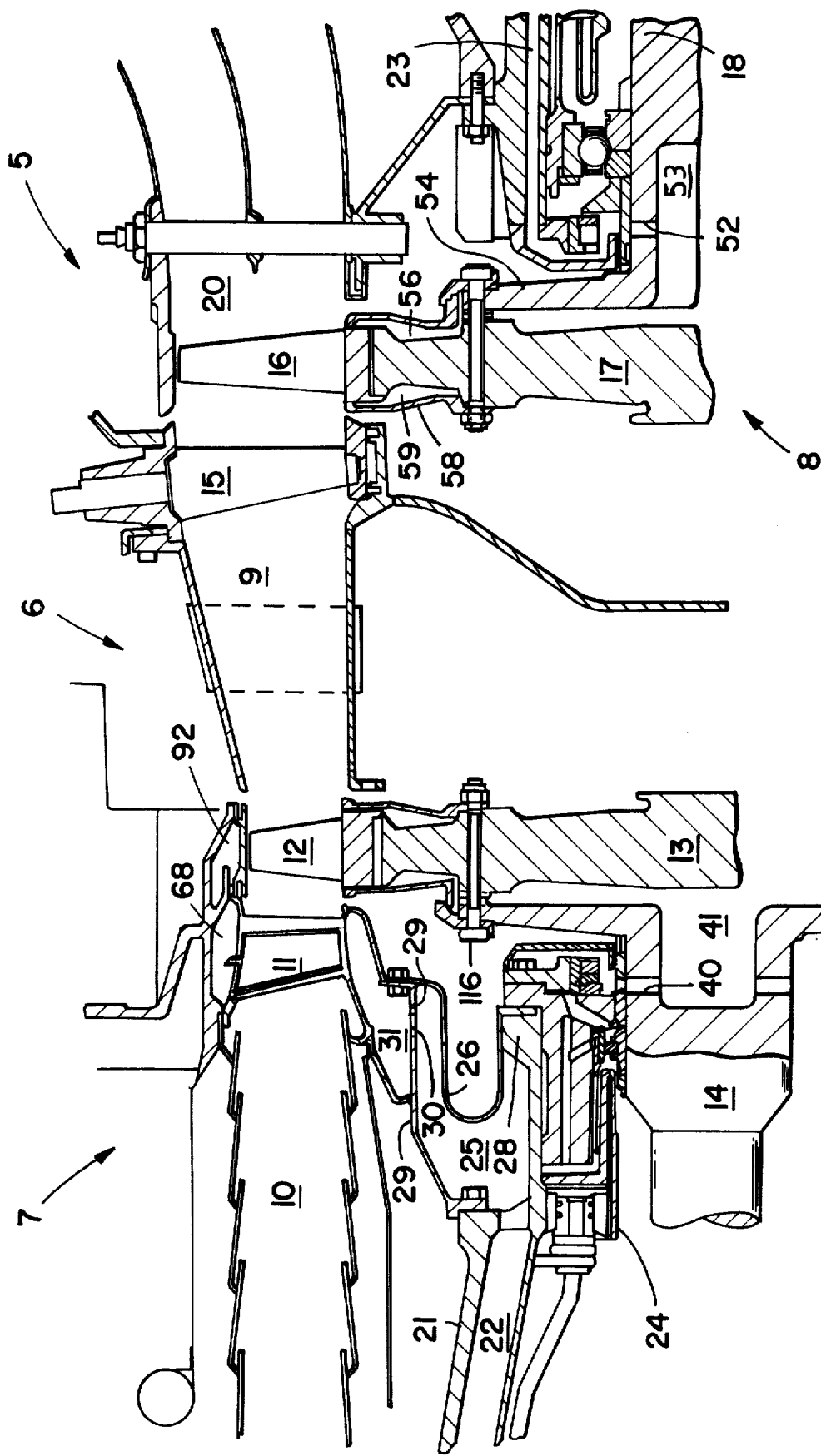
FIG_1

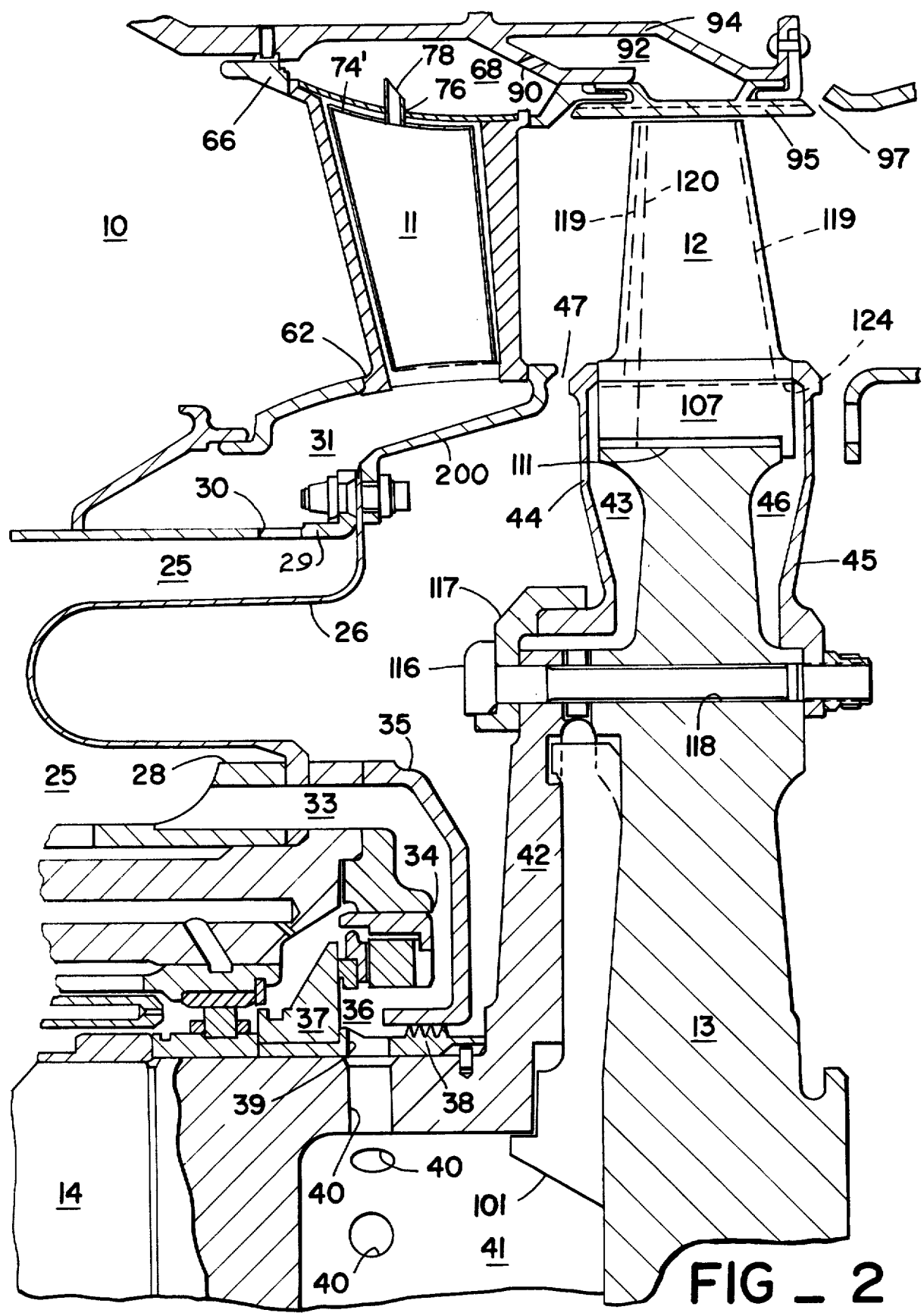

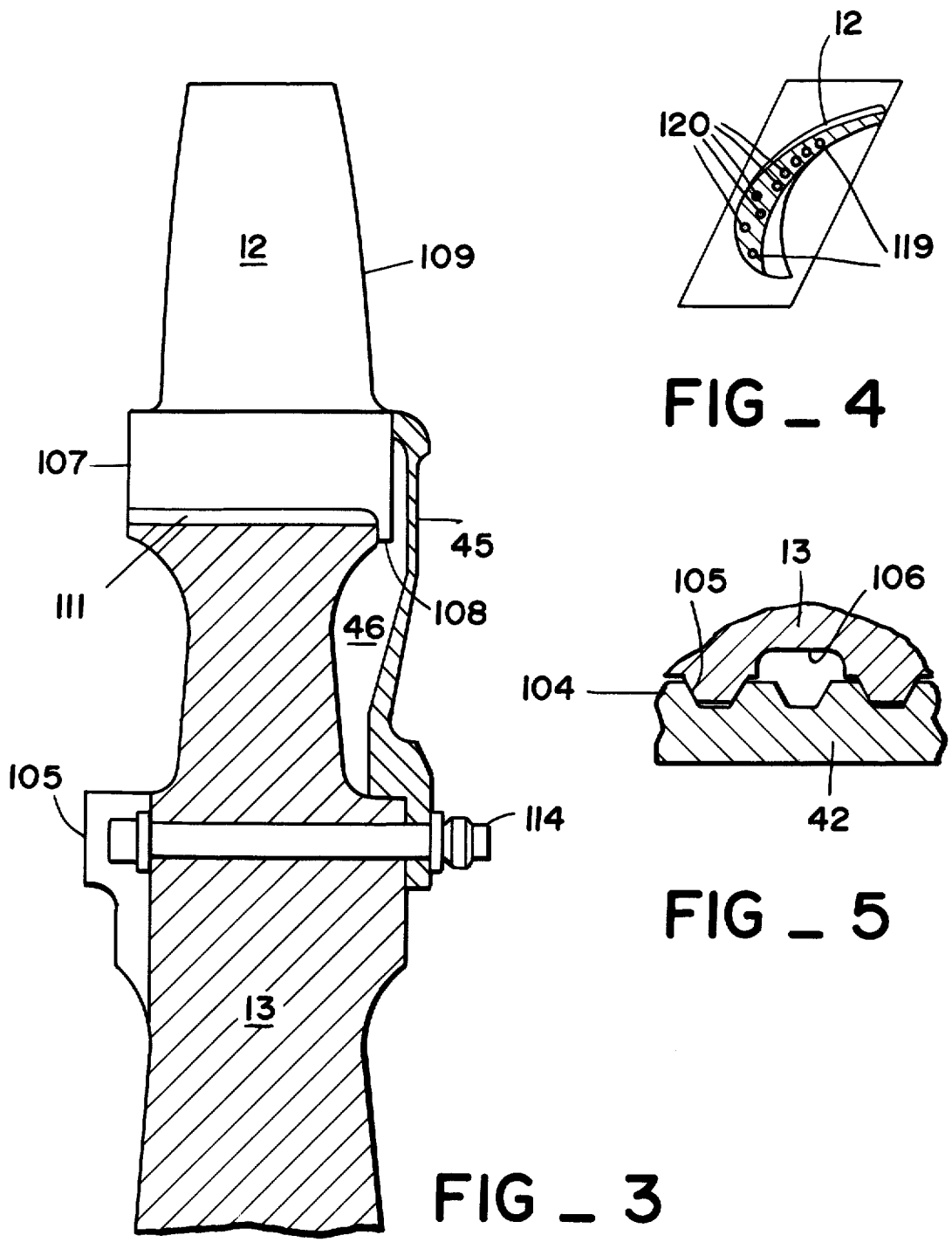
FIG _ 4
FIG _ 5
FIG _ 3
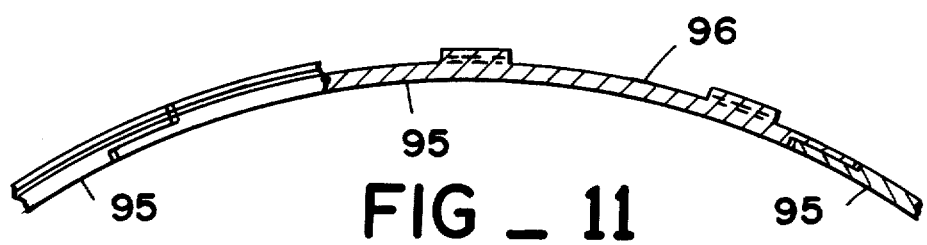
FIG _ 11

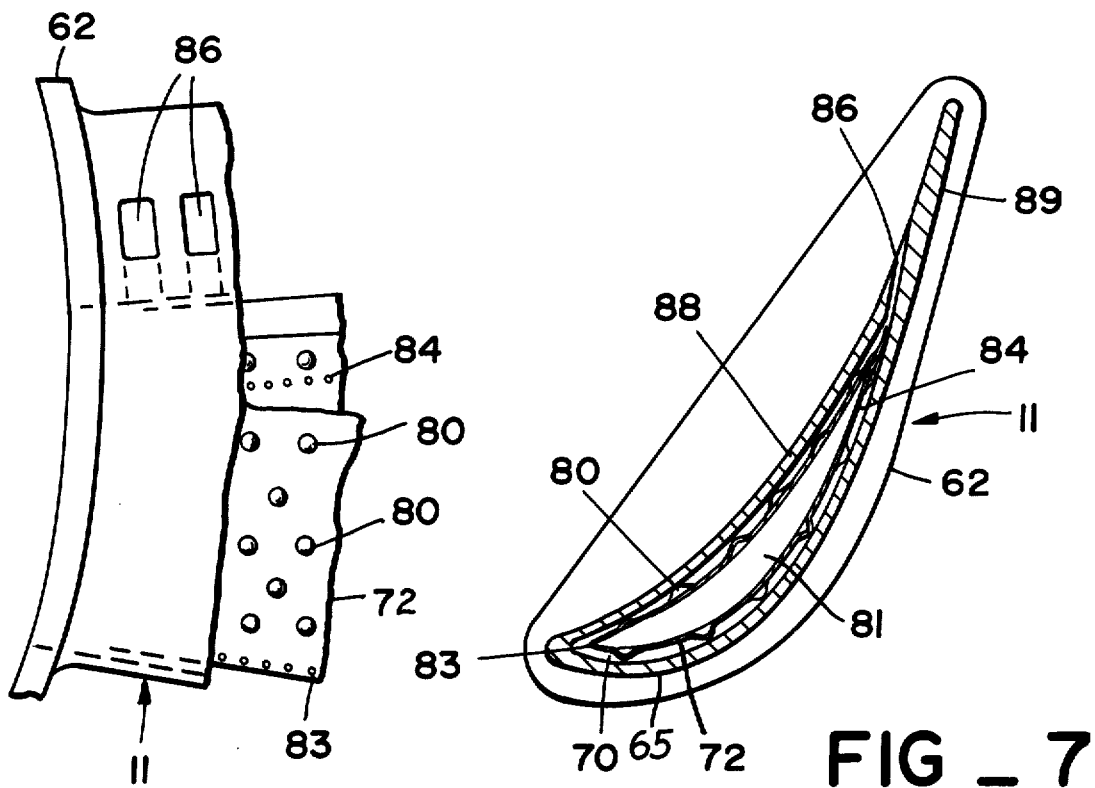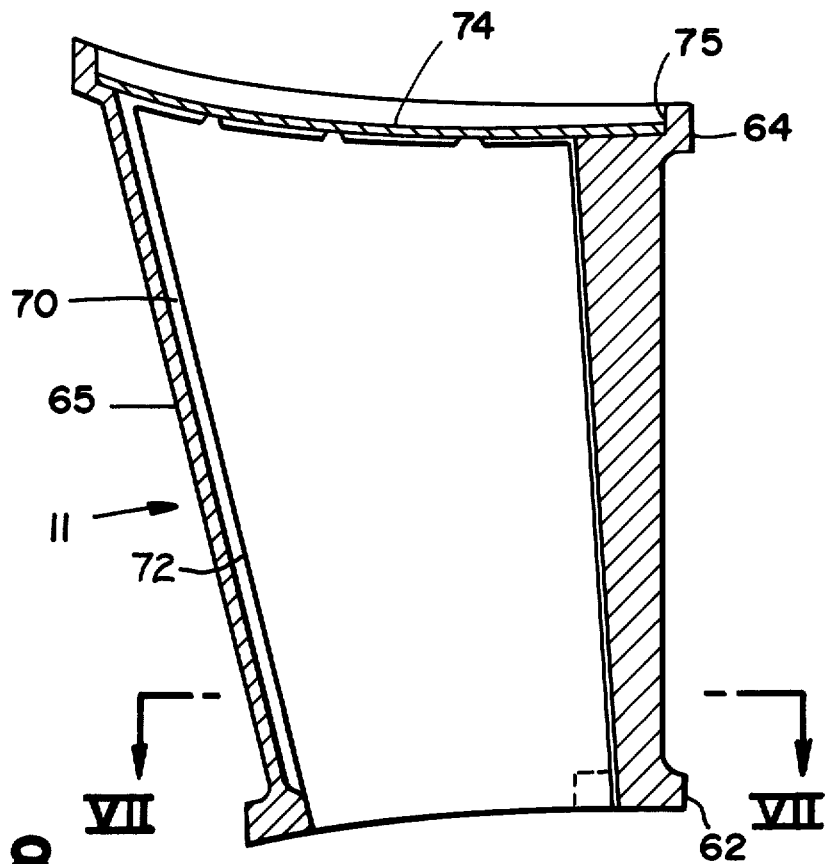

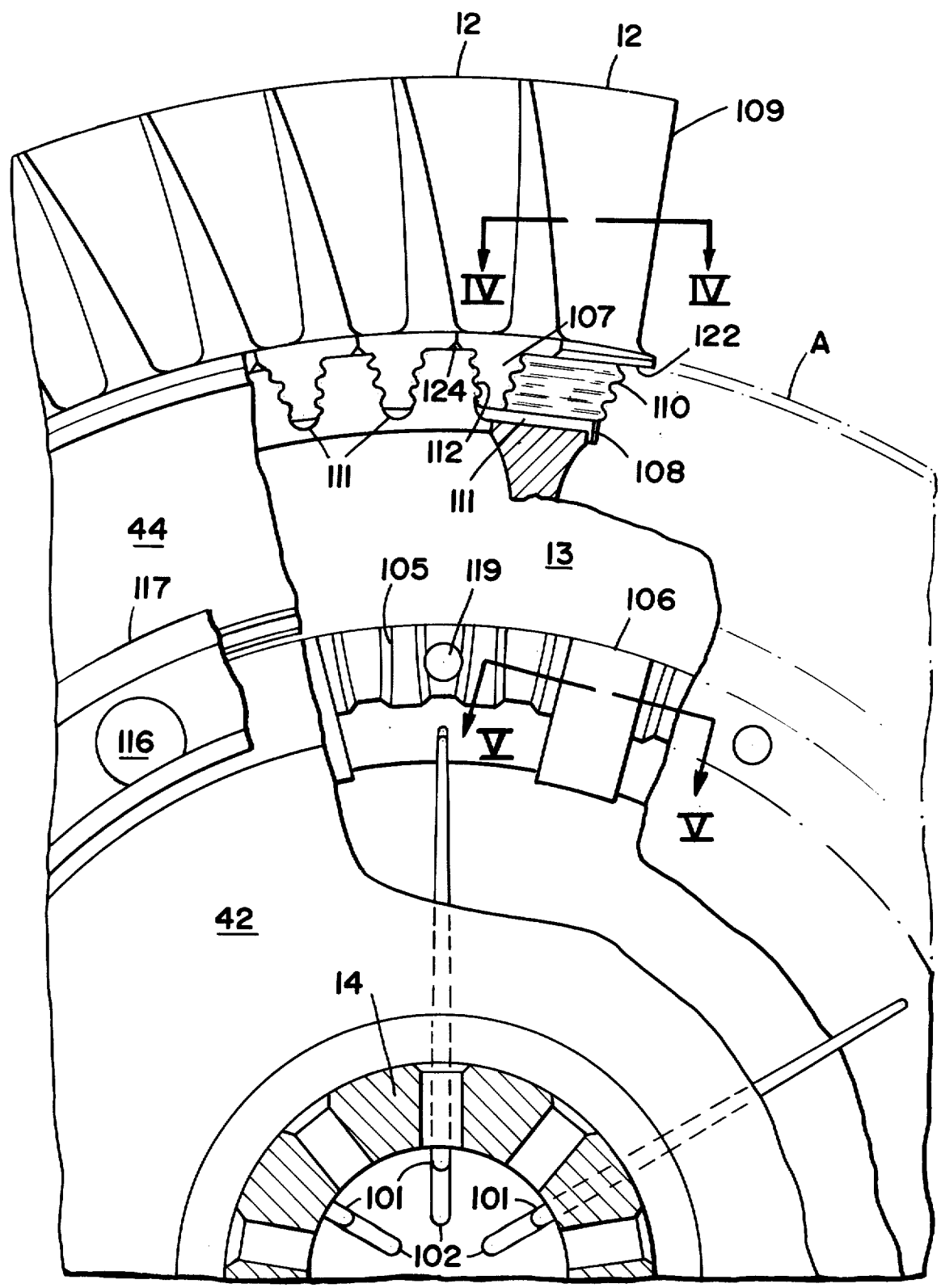
FIG _ 9

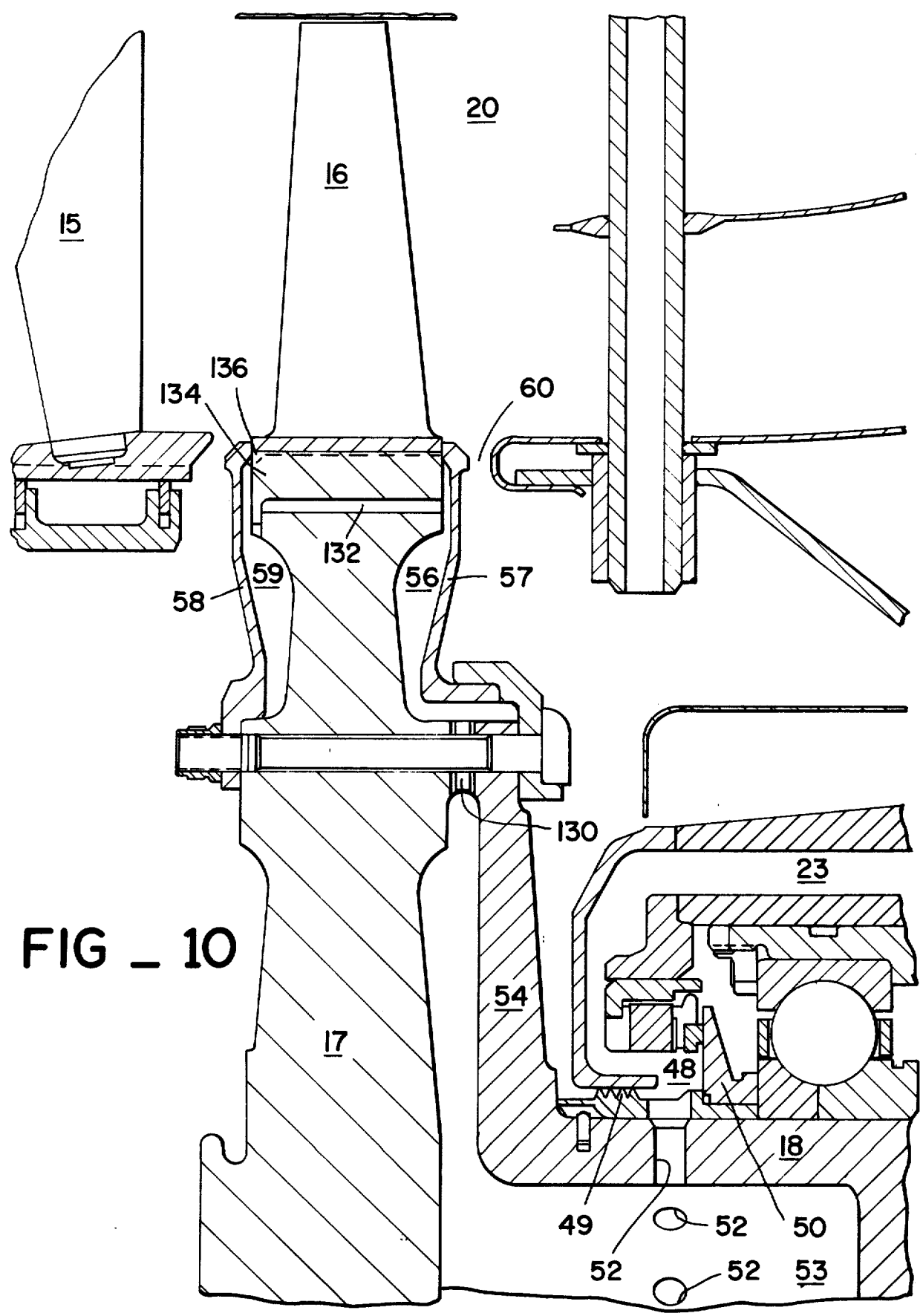

GAS TURBINE COOLING SYSTEM

BACKGROUND OF THE INVENTION

This invention relates to cooling of a gas turbine engine. In particular, it relates to gas turbine engines having a gasifier turbine and a power turbine, the gasifier turbine driving the compressor section of the turbine while the power turbine is driven by exhaust gasses communicated from the gasifier turbine through a turbine casing section. The power turbine may be interconnected through a transmission with an electric generator or the like.

Gas turbine engines, as is well-known, operate most efficiently at high temperatures. However, the structure of the gas turbine engines and in fact all mechanical structures have maximum operating limits, at least as regards operating temperature. These maximum operating temperatures are prescribed by the materials utilized in the construction of an engine. To exceed these maximum operating temperatures may result in premature failure of the engine and in some cases disastrous disintegration of a high speed turbine. Nevertheless, it is desirable to operate a gas turbine at as high a possible temperature as may be obtained consistent with the cooling capacity of the engine and the maximum operating temperature of the materials utilized therein. Many schemes have been devised for the construction of various turbine vanes utilized in gas turbine engines. The most common scheme may be longitudinally oriented cooling passages through the turbine vanes coupled with cooling air communicated outwardly through these longitudinal bores. The problem associated with such a system is that the cooling air must be provided to a turbine wheel rotating at an exceptionally high speed. In addition to cooling turbine blades, the turbine nozzle vanes must similarly be cooled. Since the turbine nozzle vanes are fixed relative the engine, supplying cooling air to these vanes does not present the problem of providing the cooling air to the rotating turbine blades as described above. The nozzle vanes are generally fixed to the turbine casing both at the inner end and the outer end; therefore, cooling air provided to internal passages in the nozzle vanes must be bled off either to an annular plenum chamber surrounding the turbine or through bleed passages integrally formed with each nozzle vane.

Expansion of the turbine casing resulting from the increase in temperature at operating speed causes a unique problem. The turbine casing may expand so that efficiency in the turbine is lost due to expanding gasses slipping past the end of the turbine blade in an inefficient manner and causing unnecessary tip turbulence at the end of the turbine blade. Accordingly, it has been found appropriate to have a close clearance between the rotating turbine blade and the turbine shroud. Expansion of the turbine shroud must be matched with expansion of the turbine wheel and the turbine blade so that clearance between the turbine blade and turbine shroud remains substantially the same.

Another problem unique is gas turbine engines is keeping the flow of expanding gasses passing downstream toward the power turbine and outwardly toward the heat exchanger. In particular, the expanding gas leaves the combustor and passes through a plurality of fixed nozzle vanes wherein it is directed against the turbine blades mounted at the periphery of the turbine wheel. The gap between the turbine wheel and the mounting for the nozzle vanes presents a possible point for the hot expanding gas to enter the area between the turbine wheel and the turbine housing raising the temperature of the various bearing components therein to an unacceptable level. Therefore, it is desirable to provide a flow of cooling air passing outwardly through the gap between the turbine wheel and the turbine housing at a pressure greater than that of the hot expanding gasses. This cooling air passing outwardly at this point prevents entry of the hot expanding gasses into the area between the turbine wheel and the turbine housing. Provision is also made for cooling air to pass into the expanding gas stream downstream of the power turbine wheel.

In summary, cooling of gas turbine engines requires special design in several areas. First, the nozzle vanes, which operate at the highest temperature, being adjacent to the combustor, must be cooled. Secondly, the gasifier turbine blades, adjacent the nozzle, must also be cooled. The mounting structure of the nozzle vane and the shroud surrounding the gasifier turbine have also proved difficult to cool. Turbulence has been found to occur between the nozzle vane support structure and the turbine wheel and further hot exhaust gasses should not be allowed to pass into the area between the turbine wheel and the turbine housing. Similar problems occur downstream in the power turbine section; however, in view of the fact that the temperatures downstream of the gasifier turbine, specifically at the power turbine, are considerably lower than that at the gasifier turbine, it has not been found necessary in all cases to provide extensive cooling means such as longitudinal cooling passages in either the nozzle vanes in the power turbine or the power turbine blades themselves.

SUMMARY OF THE INVENTION

Accordingly, this invention deals with the cooling of a gas turbine engine which includes a gasifier turbine having at least one stage and a power turbine. Provision is made in the invention to provide compressed cooling air to an axial cavity located in the turbine shaft in both the gasifier turbine section and the power turbine section. Compressed air provided to the axial cavity of each of the turbine shafts flows to a chamber formed between a flange integrally formed on the end of the shaft and the turbine wheel affixed thereto. The compressed air is then communicated outwardly to the vicinity of the turbine blades. The turbine blades are axially retained on each respective turbine wheel by a pair of retainer plates each removably fixed to one side of the turbine wheel. These retainer plates form annular cavities with the turbine wheel. Compressed air is provided to one of these annular cavities from the compressed air provided to the axial cavity of the turbine shaft. Such compressed air is further communicated to the turbine blade root for cooling of the turbine blade. The retainer plates are formed so that at low operating speeds a preload or damping force exists between the retainer plate and blade. The purpose of this preload is to seal the face between retainer plate and blade to force cooling air to pass through cooling passages before entering the main stream. As the turbine wheel increases in speed, these portions of the retainer plates are urged axially toward the turbine blade by centrifugal force acting on the specially shaped plate to further seal the annular cavity. All the compressed air then is passed through passages formed by the turbine blade root and the turbine wheel, and in the case of the gasifier turbine is communicated outwardly of the turbine blade through longitudinal cooling passages.

The means for communicating compressed air to the axial cavity of the turbine shaft is covered by a co-pending application assigned to the assignee of this application. This means includes a labyrinth seal between the turbine shaft and the bearing cage in which the turbine shaft is mounted. The labyrinth seal serves the purpose of allowing a certain amount of air to bleed through the labyrinth seal into the plenum formed between the turbine wheel and the turbine housing. This compressed air is sufficient to move outwardly of the circumferential gap formed by the turbine wheel and the turbine housing and prevent hot exhaust gasses from entering the area between the turbine wheel and the turbine housing.

Further provision is made to provide compressed cooling air into a second plenum adjacent the nozzle vanes of the gasifier turbine. Air provided to this plenum is communicated to the interior of hollow nozzle vanes each having an interior hollow shroud or liner structure. The compressed air is provided to the interior of the shroud wherein it circulates before passing outwardly of the hollow shroud through a set of apertures proximate the trailing edge of the nozzle vane. Space is provided between the hollow shroud affixed interior of the nozzle vane and the nozzle vane itself wherein cooling air may flow in a direction toward the trailing edge of the nozzle vane. A plurality of outlets in the nozzle vane communicate the hollow interior of the vane with the pressure side of the nozzle vane in the vicinity of the trailing edge. These outlets are directed generally parallel to the chord of the nozzle vane thereby directing air along the pressure side of the nozzle vane to cool the pressure side of the trailing edge by convection. The suction or convex surface of the trailing edge of the nozzle vane is cooled by convection to the compressed air passing along the pressure surface. A predetermined number of nozzle vanes are each provided with an outwardly extending tube leading into a plenum chamber which surrounds the nozzle vanes. The plenum chamber serves to cool the shroud surrounding the nozzle vanes and also the shroud surrounding the turbine blades downstream of the nozzle vanes. Air communicated to these two plenum chambers is bled outwardly into the expansion chamber downstream of the turbine blades. The shroud surrounding the turbine blades would expand diametrically if made from a solid cylindrical piece. Accordingly, in this turbine the shroud is of segmented overlapping portions. Expansion of any one single portion in the circumferential direction is taken up by the overlap with the next adjacent portion with very little diametric expansion. This construction minimizes inefficiencies found in gas turbine engines wherein the turbine blade shroud expands diametrically at a greater rate than the turbine blades and the turbine wheel thereby permitting the aforedescribed loss of efficiency around the end of the turbine blade.

Although particular attention has been paid to the construction of the gasifier turbine in this discussion, similar construction is found in the power turbine. It is to be understood that since the temperatures in the power turbine are less than that found in the gasifier turbine, certain of the cooling features found in the gasifier turbine are not repeated in the power turbine.

It is an object of this invention to provide a cooling system for gas turbine engines.

It is a further object of this invention to provide a turbine cooling system which utilizes compressed air.

It is a further object of this invention to provide a cooling system for a gas turbine engine which includes a gasifier turbine stage, and a power turbine stage.

It is still a further object of this invention to provide a cooling system for the nozzle vanes of a gas turbine engine wherein the nozzle vanes are of hollow construction.

It is still a further object of this invention to provide compressed cooling air to the roots of the turbine blades on the turbine wheel.

It is still another object of this invention to provide a bleed through of cooling air between a turbine shaft and the turbine housing to enable a flow of cooling air to pass between the turbine wheel and the turbine housing.

It is still a further object of this invention to use the cooling air which has passed through the turbine nozzle vanes to cool a plurality of plenum chambers outward of the nozzle shroud and turbine blade shroud in the gasifier turbine.

It is still another object of this invention to provide a cooling system utilizing hollow nozzle vanes wherein each nozzle vane has an internal liner of thin sheet metal.

It is still a further object of this invention to provide a gas turbine engine wherein nozzle vane cooling is provided through a plurality of orifices communicating compressed air from the interior of the nozzle vane to the exterior thereof at the pressure surface.

It is still a further object of this invention to provide a cooling system for a gas turbine engine wherein the turbine blades are axially retained on the turbine wheel by retainer plates.

It is still a further object of this invention to provide retainer plates to seal the cavity formed between the retainer plate and the turbine wheel as the speed of the wheel increases.

Broadly stated, the invention is a cooling system for a gas turbine engine having a compressor section and at least one turbine stage including a casing, a flanged shaft rotatably mounted in the casing and a turbine wheel removably fixed to the flanged shaft. The turbine cooling system comprises a plurality of turbine blades each having a root portion removably associated with the turbine wheel. Affixing the turbine blades to the turbine wheel are a first turbine blade retainer plate and a second turbine blade retainer plate. The first turbine blade retainer plate is removably fixedly associated with the turbine wheel on one side of the turbine wheel to prevent axial movement of the blades and to form a first annular cavity with the turbine wheel which communicates with the roots of the turbine blades. The second turbine blade retainer plate is removably fixedly associated with the other side of the turbine wheel to form a second annular cavity with the turbine wheel, this second annular cavity also communicates with the roots of the turbine blade. Also included is means for communicating cooling fluid under pressure to the second annular cavity.

Each of the retainer plates defining a portion for sealingly closing the first and second annular cavities with the retainer plates fixedly associated with the turbine wheel. The portions for sealingly closing the first and second annular cavities are responsive to the centrifugal force of rotation of the turbine wheel to urge the portions in first opposite directions towards said turbine wheel to increase the sealing force closing the first and second annular cavities. The turbine wheel further defines a plurality of radially extending grooves on the second side thereof. Further, the flanged shaft defines an axial cavity adjacent the fixed turbine wheel so that the turbine wheel and the flanged shaft define a chamber communicating with the second annular cavity. The means for communicating cooling fluid under pressure to the second annular cavity comprises a plurality of longitudinal members each adapted to fit a corresponding radially extending groove and provision for communicating compressed air to the aforesaid chamber. The longitudinal members separate the chamber into a plurality of sections so that the compressed air is directed radially outwardly towards the second annular cavity.

These and other objects of the invention will become apparent from a study of the accompanying drawings and following specification.

BRIEF DESCRIPTION OF THE DRAWINGS

FIG. 1 is a view partly in section of a portion of a gas turbine engine in which the cooling system described herein is utilized;

FIG. 2 is a view partly in section of the gasifier section of the gas turbine engine shown in FIG. 1 taken at a slightly different axial section line to show different features of the invention;

FIG. 3 is a portion of the gasifier turbine wheel shown in FIG. 2 with one retainer plate removed therefrom.

FIG. 4 is a cross-sectional view of the gasifier turbine blade shown in FIG. 9 taken at line IV—IV and showing longitudinal cooling passages therethrough;

FIG. 5 is a section view taken at line V—V of FIG. 9 showing a portion of the structure of the retaining plate and turbine wheel;

FIG. 6 is a partial elevation view and partly in section of the nozzle vane of a gas turbine of the type envisioned in this invention;

FIG. 7 is a sectional view taken at line VII—VII of the nozzle vane shown in FIG. 8;

FIG. 8 is an elevation view in section of the nozzle vane utilized in this gas turbine engine;

FIG. 9 is a partial view in elevation of a gasifier turbine wheel showing portions of the turbine wheel broken away;

FIG. 10 is a view partly in section of the power turbine shown in FIG. 1;

FIG. 11 is a partial view of the gasifier turbine rotor tip shroud shown in FIG. 1.

DETAILED DESCRIPTION OF THE PREFERRED EMBODIMENT

A portion of a gas turbine engine which incorporates the provisions of this invention is shown partly in section in FIG. 1. In particular, the gas turbine engine 5 shown in FIG. 1 includes a gasifier section 7 and a power section 8 interconnected by a turbine casing 6 which includes an annular expansion chamber 9. It is to be understood that the portion of the gas turbine engine depicted in FIG. 1 shows only one half of the pertinent portions of the engine, the other half being substantially identical to that depicted in FIG. 1.

The gasifier section 7 includes a combustion chamber 10 wherein the fuel is injected, mixed with compressed air and burned. The resulting expanding hot gasses are directed toward a turbine by a plurality of nozzle vanes 11 one of which is depicted in FIG. 1. The arrangement of the nozzle vanes 11 is annular in form and will be discussed in greater detail. Hot gasses after passing the plurality of nozzle vanes 11 impinge on a plurality of turbine blades 12 mounted on a gasifier turbine wheel 13 which in turn is drivingly interconnected with a turbine shaft 14. The turbine shaft is utilized to drive both the compressor (not shown) and appropriate accessories such as oil pumps and the like (also not shown) associated with the gas turbine engine. Hot exhaust gasses after imparting motion to turbine wheel 13 in the manner familiar to those in the art continue to expand in the annular expansion chamber 9 wherein it may be directed into power turbine section 8 by means of a plurality of adjustable nozzle vanes 15 which direct the hot exhaust gasses against a plurality of power turbine blades 16 mounted about the periphery of a power turbine wheel 17 drivingly mounted on a power turbine shaft 18. Power turbine shaft 18 may be interconnected with a gear reduction system (not shown) to drive a device such as an electric generator (not shown). Hot exhaust gasses after impinging on the plurality of power turbine blades 16 are directed through appropriate exhaust ducts 20.

In gas turbine engines such as that depicted in FIG. 1, the efficiency of the engine is dependent upon the temperature of the gasses impinging upon the turbine wheels. Therefore, an increase in temperature means an increase in the efficiency of the engine. However, materials for the construction of the gas turbine engine set an upper limit on the operating temperature of the engine. In particular, the nozzle vane which is the farthest upstream in the expanding gas stream is, because of its position, the most critical. In addition to hot exhaust gasses impinging directly on the nozzle vanes, the shrouds surrounding nozzle vanes 11 and the shrouds located downstream surrounding first the gasifier turbine and secondly the power turbine are also subject to extremely high temperatures. It has been found that to dissipate heat accumulated in these various sections is essential in order to achieve the efficiency inherent in high temperatures while not exceeding the temperature limitations of the particular part. Accordingly, this gas turbine engine 5, depicted in FIG. 1, includes means for providing a cool compressed gas such as air to both the gasifier turbine and the power turbine for dissipating these high temperatures. In particular, a passage 22 is provided in the gasifier turbine housing 21 for communicating compressed cooling air to the vicinity of turbine wheel 13. A similar passage 23 in power turbine section 8 provides compressed cooling air to the vicinity of power turbine wheel 17. Compressed cooling air provided to passages 22 and 23 may be bled off from the compressor section (not shown) and provided hereto for appropriate cooling.

Compressed cooling air supplied to passage 22 in the gasifier turbine housing 21 flows into an annular chamber 25. In annular chamber 25, the air flow is split by a diaphragm 26 interconnecting the bearing frame 28 with the nozzle support 29. Diaphragm 26 is formed with a U-shape, as illustrated in FIG. 1, to provide sufficient radial flexibility to accommodate the relative thermal expansion between the nozzle support and the bearing frame. The U-shape also serves to allow removal of bolts utilized in the assembly of the turbine wheel and the turbine blades. Compressed cooling gas provided to chamber 25 is further passed through a passage 30 in the nozzle support assembly 20 to an annular plenum chamber 31 wherein it may be communicated to the nozzle vanes 11 for cooling. The details of the nozzle vane assembly will become apparent.

Bearing frame 28 is formed with a plurality of passages 33, one of which is apparent in FIG. 2; the passage 33 communicates with a second passage 34 in an oil seal retainer 35 which in turn leads to a sealed cavity 36 formed about shaft 14. Sealed cavity 36, which is more thoroughly covered in a copending application, Ser. no. 728,587 is sealed at one end by a rotating seal 37 and at the end adjacent turbine wheel 13 by a labyrinth type seal 38. Cavity 36 defines a plurality of radial ports 39 which communicate with a plurality of radial ports 40 in a turbine shaft 14 communicating with an axial cavity 41 in the turbine shaft. Thus, compressed cooling air communicated to cavity 36 is further communicated to the axial cavity 41; however, labyrinth seal 38 provides a certain amount of bleed air into the space formed between oil seal retainer 35 and a flange 42 formed on the end of turbine shaft 14 for mounting turbine wheel 13. Such compressed air provided to this cavity expands outwardly through the gap 47 between nozzle inner shroud 200 and turbine wheel 13. The structure of gap 47 directs this escaping compressed air in the downstream direction. Further, the pressure of the compressed air allowed to bleed through the labyrinth seal 38 is sufficiently greater than the pressure of the expanding exhaust gasses so as to prevent expanding exhaust gasses from entering gap 47 and thus causing possible heat damage to the bearing assembly retained by bearing frame 28.

Compressed air communicated through radial passages 40 to axial cavity 41 in turbine shaft 14 is communicated outwardly through a plurality of passages formed between flange 42 and turbine wheel 13 for communication to turbine blades 12. A more detailed explanation of the compressed cooling air flow will follow; suffice it to say at this time that compressed cooling air is further communicated to an annular cavity 43 formed by turbine wheel 13 and a blade retainer plate 44 affixed to turbine wheel 13. A similar retainer plate 45 is affixed to the opposite side of turbine wheel 13, the two retainer plates forming the aforementioned annular cavity 43 and a similar annular cavity 46. Retainer plates 44 and 45 are constructed so that when affixed to the turbine wheel a clamping force in the form of a preload urges the outer perimeter of each plate toward the turbine wheel to seal the joint therebetween so that compressed air communicated to annular cavity 43 is forced through cooling passages in the turbine blades. As the speed of the turbine wheel 13 increases retainer plates 44 and 45 and urged axially toward the turbine blades 12 by centrifugal force to provide an increased clamping or sealing force to counteract any increased pressure in the compressed air flow provided to cavity 43. This will become more apparent in the detailed description of the cooling of turbine blade 12.

Referring now to FIG. 10 for a brief description of the cooling in the power turbine, it can be seen that the similar type of construction is used in the power turbine. In particular, cooling air communicated to passage 23 passes into a cavity 48 sealed by a labyrinth seal 49 and a rotating seal 50. Compressed air communicated to cavity 48 is further communicated radially inwardly of shaft 18 through a plurality of radial ports 52 to an axial cavity 53 formed in power turbine shaft 18. As discussed above, compressed air provided to axial cavity 53 follows a similar outward path between power turbine wheel 17 and a flange 54 formed on the end of power turbine shaft 18 to a cavity 56 formed between turbine wheel 17 and a blade retainer 57. A similar blade retainer plate 58 is affixed to an opposite side of turbine wheel 17 forming a second cavity 59. Compressed air provided to cavity 56 acts in the same manner as the compressed air supplied to cavity 43, that is blade retainer plate 57 is formed so that a portion of plate 57 is urged toward turbine wheel 17 to seal cavity 56. When turbine speed is increased to operating speed the retainer plate 57 is urged axially toward the power turbine blade 16 by centrifugal force thereby increasing the clamping force in the joint between the blade retainer plate and the turbine wheel. During high speed operation compressed air is communicated to the root of turbine blade 16 as will become apparent in the detailed discussion below. Compressed cooling gasses pass labyrinth seal 49 in a manner similar to that described in the gasifier turbine to exit through a gap 60 formed between the turbine wheel assembly 17 and the exhaust ducting, the compressed air that passes through gap 60 prevents or precludes hot exhaust gasses from entering the vicinity of the turbine bearing to cause damage thereto.

Having generally set forth the main directions of flow of compressed cooling gas the following discussion will provide a detailed description of the construction and flow of cooling gas through each particular area, namely the nozzle vanes, the gasifier turbine blades, and finally the power turbine blades.

COOLING OF THE NOZZLE VANES

Compressed cooling air is communicated to annular plenum chamber 31 in contact with the base of the plurality of nozzle vanes 11. Referring to FIG. 8, a nozzle vane 11 is shown partly in section. At either end of the nozzle vane is an enlarged footing such as base 62 forming a root portion at the inner end and flange 64 at the outer end. Both base 62 and flange 64 are machined with relatively close tolerances. Referring again to FIG. 2, it can be seen that base 62 is fitted in a similarly machined slot in nozzle inner shroud 200. The vanes 11 are held in place in nozzle inner shroud 200 by brazing the base 62 thereto. Thus, the plurality of nozzle vanes 11 are affixed integrally with the nozzle inner shroud 200 to extend outwardly therefrom. The flange 64 is formed to fit through a similarly machined opening in nozzle shroud 66. The flange 64 is not affixed by brazing to nozzle shroud 66, but the close tolerances previously mentioned serve to substantially seal the annular chamber 68 which is formed outside the nozzle vanes and which substantially surrounds the hot exhaust gas path described above.

Referring again to FIGS. 6, 7 and 8 for detail of the construction of the nozzle vanes, it can be seen that each nozzle vane 11 is of hollow construction and open at base 62. Contained in the cavity 70 interior of the airfoil portion 65 of the nozzle vane is a hollow sheet metal shroud or liner 72. Sheet metal liner 72 is retained in cavity 70 by a cover plate 74 affixed to the nozzle vane at the outer end thereof in the vicinity of flange 64, and, in particular, in a recess 75 formed in the outer end of the nozzle vane. Cover plate 74 is brazed in recess 75 to sealingly close the outer end of the nozzle vane. As can be seen in FIG. 8, the nozzle vane is of a wider dimension at the outer extremity than at the base and thus sheet metal liner 72 is adequately retained in the cavity 70. A predetermined number of plurality of nozzle vanes 11 are constructed with a cover plate 74' as depicted in FIG. 2, the cover plates 74' have defined therein a hole 76, the purpose of which will become apparent in the discussion of the sheet metal liner 72. Suffice it to say at this point, a tube 78 is affixed to the sheet metal liner and projects through hole 76 (see FIG. 2).

Referring specifically to FIG. 6 where vane 11 is shown broken away to show sheet metal liner 72, and further referring to FIG. 7, it may be seen that liner 72 is formed with a plurality of projections 80 formed in the surface thereof to space the liner 72 inwardly of the nozzle vane thus forming an outer cavity between the nozzle vane and the thin sheet metal liner. The inner end of sheet metal liner 72 adjacent to base 62 is open to annular plenum chamber 31 to allow compressed cooling air to pass into the interior portions 81 of thin sheet metal liner 72. Formed along the leading edge of the thin sheet metal liner is a plurality of small apertures 83 communicating interior portion 81 with the outer cavity 70 between the thin sheet metal liner and the interior of nozzle vane 11. Similarly, at trailing edge of the thin sheet metal liner is a second plurality of apertures 84 communicating the interior 81 of the thin sheet metal liner with the outer cavity 70 between the liner and the nozzle vane. The nozzle vane is formed with a series of apertures 86 leading from cavity 70 in a generally chord wise direction toward the trailing edge of the vane and outwardly of cavity 70. Apertures 86 open onto the pressure or concave surface of the airfoil shaped nozzle vane 11; thus, cooling air communicated to interior portion 81 passes through apertures 83 and apertures 84 then outwardly through apertures 86. The pressure of the cooling air exiting through aperture 86 is sufficiently greater than the main gas stream pressure so that there is little or no impairment in air flow. Thus, cooling of the nozzle vane 11 occurs by impingement of cooling air on the nozzle vane in the vicinity of the apertures 83 and 84, and conduction through the wall of the nozzle vane to cavity 70 thence by convection to the air stream passing between thin sheet metal liner 72 and the inner wall of the nozzle vane 11. Cooling of the nozzle vane in the vicinity of trailing edge is generally provided by a combination of conduction and convection to the film of air formed on the pressure side of the nozzle vane provided by apertures 86. In particular, the trailing edge portion of pressure surface 88 is protected by the film of cooling air provided from aperture 86 between the vane and the main gas stream, while suction surface 89 is cooled by conduction through the vane to the pressure surface and then by convection to the aforesaid film of cooling air adjacent to the surface.

As previously mentioned, a predetermined number of nozzle vanes 11 are formed so that cover plate 74 takes the form depicted in FIG. 2 of cover plate 74' to allow the addition of a tube 78 to project therethrough, tube 78 communicating with interior portion 81 of the thin metal liner. Tube 78 therefore communicates compressed cooling fluid to annular chamber 68 radially disposed outwardly from the nozzle vane. Cooling air thus communicated is passed through a plurality of apertures 90 generally oriented on the downstream side of annular chamber 68 relative the engine and communicating with a second annular plenum chamber 92 generally oriented radially outwardly from the plurality of turbine blades 12. Second annular plenum chamber 92 is formed on the outside by the tip shroud retainer 94 and on the inner side by a plurality of circumferential segments 95 each formed at the downstream end with a plurality of gaps or openings 96 (see FIG. 11) to allow compressed cooling air in second annular plenum chamber 92 to escape into the main gas stream through a second opening 97. Circumferential segments 95, as can be seen in FIG. 11, are arranged in an overlapping relationship so that longitudinal thermal expansion of each individual segment 95 is taken up by the overlapping portion of the next adjacent circumferential segment 95. Thus, at the high operating temperatures of the gas turbine there is little radial expansion of the tip shroud arrangement, thus preserving the efficiency of the plurality of turbine blades 12. As is well known in the art, any spillage of gas flow over and around the end of the individual turbine blades 12 causes inefficiency in the engine.

In summary, the cooling of nozzle vanes 11 in addition to discharging downstream of the nozzle vane through the plurality of apertures 86 defined in the vanes also includes in a predetermined number of vanes means for providing cooling air to the shroud assembly surrounding vanes 11 and the turbine blades 12 to provide a degree of cooling to the shroud assembly.

COOLING OF THE GASIFIER TURBINE BLADES AND TURBINE WHEEL

Referring to FIG. 2 in conjunction with FIG. 9, it can be seen that compressed air for cooling purposes communicated to axial cavity 41 will flow outwardly between the flange 42 and turbine wheel 13. A plurality of longitudinal members 101 are positioned radially about turbine wheel 13 in the space formed between the turbine wheel and the flange to insure that outward air flow in this space takes place in a radial direction rather than taking on a tangential flow. These longitudinal members 101 may be adapted to fit in specially machined grooves 102 and move outwardly with the rotation of the turbine wheel 13. This construction, allowing radial movement of members 101, allows greater tolerances in the fit between the turbine wheel and the flange. Flange 42 has integrally formed therewith a serrated edge 104, best shown in cross-section in FIG. 5. Serrated edge 104 is adapted to match and mate with a similarly formed serrated edge 105 formed in turbine wheel 13. Turbine wheel 13 has formed coincident with the serrated portion 105 a plurality of radially directed grooves 106, which may be seen in FIG. 5 and FIG. 9, to allow communication of compressed cooling air from axial cavity 41 to annular cavity 43 for cooling the turbine blades 12.

Referring now to FIG. 3, turbine wheel 13 is shown with a turbine blade 12 affixed thereto and the one retainer plate 45 attached to turbine wheel 13. Turbine blade 12 has a root portion 107 for mating with the turbine wheel. The root portion has formed at one end thereof a downwardly extending projection 108, while axially formed on the root portion is a serrated surface 110, best seen in FIG. 9, adapted to fit a similarly formed serrated groove 112 in the outer perimeter of turbine wheel 13. These mating serrated surfaces are for radially retaining the turbine blade with the turbine wheel while forming a cavity 111 between root portion 107 and turbine wheel 13. Referring again to FIG. 3, it can be seen that projection 108 extends downwardly and abuts the side surface of turbine wheel 13 so that with root 107 mated with the serrated groove 112 of the turbine wheel, withdrawal of the turbine blade may only be in the generally axial direction opposite flange 42 as seen in FIG. 2. It is noted that the axes of serrated groove 112 and root portion 107 are skewed from the axis of the wheel in a manner well known in the art.

Thus, retainer plate 45 which is shown in FIG. 3 affixed to turbine wheel 13 by a bolt means 114 serves to axially retain the plurality of turbine blades 12 in a fixed relationship with turbine wheel 13. As previously mentioned, retainer plate 45 forms an annular cavity 46 with the turbine wheel 13. Referring now to FIG. 2, retainer plate 44 is positioned on the opposite side of turbine wheel 13 and assembled with the flange 42. A second bolt means 116 and an annular ring 117 are affixed to the outer perimeter of flange 42 permitting turbine wheel 13 to be mated with flange 42. Turbine wheel 13 carries a plurality of mounting holes 118 through which bolt means 116 and bolt means 114 are alternatively passed. As can be seen in FIG. 9 and in conjunction with FIG. 2, compressed cooling air passing from axial cavity 41 outwardly through groove 106 into annular cavity 43 may pass through or into cavities 111 at the bases of the plurality of turbine blades 12. Turbine blades 12, as can be seen in FIG. 4, are formed with a plurality of longitudinally extending bores 119 and 120. Referring again to FIG. 9, each turbine blade 12 is positioned in the appropriate serrated groove in turbine wheel 13 forming the cavity 111. In addition to cavity 111, each root portion of the turbine blade abuts against the next adjacent root portion and has a chamfered edge 122 adjacent the turbine wheel. Adjacent chamfered edges 122 form with the outer perimeter of turbine wheel 13 a cavity 124. The cavity 124 is fitted with a round wire seal in accord with the teaching of U.S. Pat. No. 3,709,631, assigned to the assignee of this invention. Centrifugal force causes these seals to be forced against adjacent chamfered edges of the root portion to form a cooling air seal therebetween. Referring back to FIG. 2, it can be seen that at least two longitudinal cooling passages 119 extending outwardly of the turbine blade terminate at root 107 at axial cavity 124 just described, while the remaining longitudinal cooling passages 120 extend downwardly through the turbine root 107 to cavity 111. Cooling air in annular cavity 43 which is free to pass into either cavities 111 or cavities 124 is thus communicated outwardly by longitudinal bores 120 or 119 respectively. The turbine blade is formed with these bores extending through the airfoil portion 108 of the blade to the outer end of the turbine blade thereby allowing cooling air to flow outwardly into the expansion chamber and assist in cooling circumferential segments 95. As previously mentioned, retainer plates 44 and 45 are formed so that the peripheral portions are each urged in opposite directions toward the turbine wheel to seal axial cavities 43 and 46 forcing cooling air axially into cavities 111 or 124. As the turbine increases in speed, the structure of the retainer plates causes centrifugal force to further urge the two retainer plates in same opposite directions axially toward the turbine wheel to increase the sealing force closing cavities 43 and 46 counteracting any increase in cooling air pressure.

COOLING OF THE POWER TURBINE SECTION

Cooling of the power turbine section 8 follows essentially that of the gas turbine section 7 with some minor changes. Initially, it should be noted that there is no internal cooling of the nozzle vanes 15 in this embodiment, nor is there any internal cooling of power turbine blades 16. In view of the lack of internal cooling of the power turbine blade 16, the comparable passage from annular cavity 56 to axial cavity 136 which exists in the gasifier turbine is not provided in the power turbine section, nor are seals utilized in cavities 136. However, in the event that temperature in the power turbine section in higher horsepower turbine engines of this design require internal cooling, redesign of the mounting of power turbine blades 16 to conform to the mounting of gasifier turbine blades 12 would be easily accomplished. Turbine blade root cooling is provided in passages 132 and 136 as will become evident.

As previously described, cooling compressed air is provided at passage 23 to axial cavity 53 of power turbine shaft 18 wherein it is communicated outwardly between the flange 54 and turbine wheel 17, which is affixed to flange 54 in the same manner as the gasifier turbine wheel. Compressed cooling air passes through a plurality of grooves 130 formed in the serrated edge of the turbine wheel 17 in the same manner as grooves 106 in the gasifier turbine and then into the annular cavity 56, wherein it is further communicated to an axial cavity 132 formed by root portion 134 and turbine wheel 17 in the manner of cavity 111 of the gasifier turbine. Compressed cooling air communicated to cavity 132 is further communicated to an annular cavity 59 formed by retainer plate 58 and turbine wheel 17 thence upwardly into a series of axial cavities 136 formed between adjacent turbine blades 16. In view of the omission of the seals in axial cavities 136 cooling air supplied to cavities 136 is allowed to bleed between adjacent turbine blades outwardly into the expansion chamber and the main gas stream.

OPERATION

Although it should be apparent from the previous description how this gas turbine cooling system operates, a brief review of the three major cooling areas will be covered in the following description of the operation.

In the gasifier turbine section, compressed cooling air is provided to cavity 25 wherein it take two paths; one leading to axial cavity 41 of turbine shaft 14 for cooling of turbine wheel 13 and the associated turbine blades 12, the other path being to an annular plenum chamber 31 wherein it is communicated to nozzle vanes 11 and thence outwardly to the expanding gas stream and to plenum chambers surrounding the vane shrouds. In addition to providing cooling air to axial cavity 41, a labyrinth seal 38 between turbine shaft 14 and a bearing retainer plate 35 fixed to the turbine housing allows a certain degree of air to bleed through into the space between the turbine wheel and the turbine housing. This bleed through air is allowed to escape through gap 47 between turbine wheel 13 and the nozzle inner shroud 200. This bleed through air prevents hot exhaust gasses from expanding into the space adjacent the bearing and thereby adversely affecting the bearing assembly.

Compressed cooling air communicated to annular plenum chamber 31 is communicated through thin sheet metal liners 72 positioned in cavity 70 of each nozzle vane 11. The thin sheet metal liners 72 are formed with a plurality of apertures 83 and 84 allowing cooling air to bleed into the space between the sheet metal liner and the nozzle vane thereby through conduction and convection accomplishing cooling of the nozzle vane. A plurality of apertures 86 is provided near the trailing edge of each nozzle vane to bleed cooling air outwardly on the pressure surface side of the nozzle vane thereby providing through convection and conduction a cooling effect to the trailing edge of the nozzle vane. A predetermined plurality of nozzle vanes is provided with tubes 78 communicating compressed cooling air from interior portion 87 into a series of annular plenum chambers 68 nad 92 in order to maintain the tip shroud temperatures at an optimum operating level. The tip shroud retainers 95 formed about the inner perimeter of annular plenum chamber 92 and surrounding the turbine blades 12 are formed by a plurality of members one overlapping the next member so that expansion of each individual member is generally taken up circumferentially rather than radially. This design insures the clearance between turbine blades 12 and the associated turbine blade shroud is maintained in a proper relationship throughout the operating temperature range of the engine. To allow the turbine shroud to expand excessively would be to lose efficiency in the engine.

Cooling air communicated to axial cavity 41 is allowed to flow outwardly into an annular cavity 43 wherein it is communicated to a plurality of longitudinal bores 119 and 120 in each turbine blade 12 to cool the turbine blade. Air communicated to these bores is allowed to escape into the exhaust stream at the tip of the turbine blade 12.

Cooling of the power turbine section follows that of the gasifier turbine with the exception of internal vane cooling and further discussion of the operation of this power section is not considered necessary.

Although this invention has been described in relation to a particular gas turbine engine, the principles of the invention disclosed herein are not to be considered limited to a gas turbine engine of this design but are applicable to other devices requiring cooling of this type.

What is claimed is:

1. A gas turbine engine cooling system for a gas turbine engine having a compressor section, at least one turbine stage including a casing, a flanged shaft rotatably mounted in the casing and a turbine wheel removably fixed to the flanged shaft, the turbine cooling system comprising:
  a plurality of turbine blades each having a root portion and each removably associated with the turbine wheel;
  a first turbine blade retainer plate;
  a second turbine blade retainer plate;
  said first turbine blade retainer plate removably fixedly associated with said turbine wheel on a first side of said turbine wheel to prevent axial movement of said blades and forming a first annular cavity with said turbine wheel, said annular cavity communicating with said root portions of said turbine blades; said second turbine blade retainer plate removably fixedly associated with said turbine wheel on the second opposite side and adjacent the flanged shaft to form a second annular cavity therewith, said second annular cavity communicating with said root portions of said turbine blades;
  each of said retainer plates forming means for sealingly closing said first and second annular cavities with said retainer plates fixedly associated with said turbine wheel, said means for sealingly closing said first and second annular cavities being portions of each of said retainer plates, said portions of said retainer plates responsive to centrifugal force of rotation of said turbine wheel to urge said portions in first opposite direction towards said turbine wheel to increase said sealing force closing said first and said second annular cavities;
  means for communicating cooling fluid under pressure to said second annular cavity;
  the turbine wheel defining a plurality of radially extending grooves on the second side thereof and further wherein the flanged shaft defines an axial cavity adjacent the affixed turbine wheel so that said turbine wheel and said flanged shaft define a chamber communicating with said second annular cavity, and further wherein the means for communicating cooling fluid under pressure to said second annular cavity comprises a plurality of longitudinal members each adapted to fit in a corresponding radially extending groove and a compressed air means for communicating compressed air to said chamber; said longitudinal members separating said chamber into a plurality of sections whereby compressed air is directed radially outwardly towards said second annular cavity.

2. The gas turbine engine cooling system as set forth in claim 1 wherein the turbine stage includes a nozzle assembly including a plurality of radially projecting nozzle vanes affixed to the turbine casing and an annular shroud encompassing said nozzle assembly and the plurality of turbine blades, said annular shroud defining a first annular shroud cavity proximate said nozzle vanes and a second annular shroud cavity axially displaced from said first annular shroud cavity and proximate to said turbine blades, said first and second annular shroud cavities in communication;
  a predetermined number of said nozzle vanes less than the total number defining passage means for communicating cooling fluid from said casing to said first annular shroud cavity;
  and further wherein the means for communicating compressed cooling fluid to the first annular shroud cavity includes means for communicating compressed cooling fluid to said predetermined number of said nozzle vanes.

3. The gas turbine engine cooling system as set forth in claim 2 wherein said plurality of turbine blades each have an airfoil portion, and further wherein said turbine blades are affixed to said turbine wheel at the root portion;
  said root portion and said turbine wheel forming a generally axially aligned cavity communicating with the second annular cavity to permit cooling fluid to pass therein.

4. The gas turbine engine cooling system as set forth in claim 3 wherein the turbine stage comprises a power turbine section and further wherein the turbine wheel axial cavity communicates with the first annular cavity formed by the first turbine blade retainer plate and the turbine wheel, and further wherein the turbine blade root and the turbine wheel form a second axial cavity radially displaced outwardly from the first axial cavity, said axial cavity communicating with said first annular cavity and said second axial cavity communicating outwardly of the tubine wheel.

5. The gas turbine engine cooling system as set forth in claim 3 wherein said turbine blade root forms a second axial cavity with said turbine wheel, said second axial cavity communicating with the second annular cavity, and further wherein said turbine blades define a plurality of longitudinal bore in the airfoil portion, at least one of the longitudinal bores communicating with said second axial cavity.

6. The gas turbine engine cooling system as set forth in claim 5 wherein at least one of the longitudinal cooling passages communicates with the first axial cavity.

7. The gas turbine cooling system as set forth in claim 3 wherein each nozzle vane includes a root portion fixable with said turbine casing, and an airfoil portion, said airfoil portion defining an interior cavity extending longitudinally therethrough, and further wherein said nozzle vane includes a cover plate integrally affixed to the end of the nozzle vane opposite the root end, the cooling system further comprising a plurality of airfoil shaped shroud structures each formed to fit in a longitudinal cavity of a nozzle vane and divide said longitudinal cavity into an inner section and an outer section, said outer section formed between the shroud structure and the nozzle vane, said shroud structure defining a plurality of outwardly extending protrusions to spatially separate said shroud structure from said nozzle vane, the compressed cooling fluid communicated to the nozzle vanes is further communicated to said inner section;
- said shroud structure defining a plurality of first apertures at the leading edge thereof and a plurality of second apertures at the trailing edge thereof, said apertures communicating compressed cooling fluid from the inner section to the outer section;
- said nozzle vane defining a plurality of third apertures venting the outer section of said nozzle vane, said third apertures in general parallel alignment with the chord of the vane and communicating compressed cooling fluid outwardly of said nozzle vane on the pressure surface of the nozzle vane in the direction of the trailing edge of the nozzle vane.

8. The gas turbine engine cooling system as set forth in claim 2 wherein the annular shroud further comprises a plurality of shroud members each having an arcuate shape and assembled in overlapping relation with the adjacent shroud member to form a substantially cylindrical inner wall of the second annular shroud cavity adjacent the turbine blade so that thermal expansion of the annular shroud in the vicinity of the second annular chamber in a radial direction is minimized.

9. In a gas turbine engine having a compressor section providing a source of relatively cool compressed air, a gasifier turbine section and a power turbine section, a cooling system comprising:
- a first turbine shaft rotably mountable in said gasifier turbine section and having an integrally formed turbine wheel mounting flange formed at one end and defining an axial cavity at the same end;
- means for communicating the relatively cool compressed air to said turbine shaft axial cavity;
- a turbine wheel removably fixable to said turbine wheel mounting flange to substantially close said axial cavity and to form with said turbine wheel mounting flange a substantially closed chamber;
- a plurality of turbine blades each having a serrated root end and an elongated airfoil end, each of said plurality of turbine blades removably fixable to said turbine wheel at said root end;
- a first turbine blade retainer plate;
- a second turbine blade retainer plate;
- said first turbine blade retainer plate removably associated with said turbine wheel on one side distal the flange to prevent axial movement of said blades and forming a first annular cavity with said turbine wheel, said second retainer plate removably associated with said turbine wheel on the other side proximate the flange to form a second annular cavity with the turbine wheel, said second annular cavity communicating with the closed chamber;
- each of said retainer plates forming means for sealingly closing said first and second annular cavities with said retainer plates fixedly associated with said turbine wheel, said means for sealingly closing said first and said second annular cavities being portions of each of said retainer plates, said portions of said retainer plates responsive to centrifugal force of rotation of said turbine wheel to urge said portions in first opposite direction towards said turbine wheel to increase said sealing force closing said first and said second annular cavities;
- said turbine wheel defining a plurality of radially extending grooves on said other side thereof; and
- a plurality of longitudinal members each adapted to fit in a corresponding radially extending groove, said longitudinal members separating said closed chamber into a plurality of sections whereby compressed air communicated to said closed chamber is directed outwardly toward the said annular cavity.

10. The gas turbine cooling system as set forth in claim 9 further comprising a nozzle assembly including a plurality of radially projecting nozzle vanes affixed to said turbine casing and an and annular shroud encompassing said nozzle assembly and the plurality of turbine blades, said shroud defining a first shroud cavity proximate said nozzle vanes and a second shroud cavity axially displaced from said first shroud cavity and proximate said turbine blades;
- said first shroud cavity communicating with said second shroud cavity;
- and wherein the means for communicating relatively cool compressed air to the turbine shaft axial cavity further comprises means to communicate compressed cooling fluid to the nozzle vanes;
- a predetermined number of said nozzle vanes defining passage means for communicating cooling fluid from said casing to said first shroud cavity.

11. The gas turbine cooling system as set forth in claim 10 further comprising a second turbine shaft rotatably mountable in the power turbine section and having an integrally formed power turbine wheel mounting flange formed at one end and defining a second axial cavity at the same end;
- means for communicating the relatively cool compressed air to said second axial cavity;
- a power turbine wheel fixable to said power turbine wheel mounting flange to substantially close said second axial cavity to form with said power turbine wheel mounting flange a second closed chamber;
- a plurality of power turbine blades having a serrated root end and an elongated airfoil end said plurality of power turbine blades removably fixable to said power turbine wheel at said root end;
- a first power turbine blade retainer plate;
- a second power turbine blade retainer plate;
- said first power turbine blade retainer plate removably associated with said power turbine wheel on one side distal the power turbine wheel mounting flange to prevent axial movement of said power turbine blades and forming a third annular cavity with said power turbine wheel, said second retainer plate removably associated with said power turbine wheel mounting flange to form a fourth annular cavity with said power turbine wheel, said fourth annular cavity communicating with the second closed chamber;

each of said power turbine retainer plates forming means for sealingly closing said third and fourth annular cavities with said power turbine retainer plates fixedly associated with said power turbine wheel, said means for sealingly closing the said third and said fourth annular cavities being portions of said power turbine retainer plates, said portions responsive to centrifugal force of rotation of said power turbine wheel to urge said portions in first opposite directions towards said power turbine wheel to increase said sealing force closing said third and said fourth annular cavities.

12. The gas turbine engine cooling system set forth in claim 11 wherein the root portion of the gasifier turbine blades form a generally axial cavity communicating with the second annular cavity to permit cooling fluid to pass therein.

13. The gas turbine cooling system as set forth in claim 12 wherein the plurality of power turbine blade root portions and the power turbine wheel form a generally axially aligned cavity communicating with the fourth annular cavity to permit cooling fluid to pass therein.

14. The gas turbine engine cooling system as set forth in claim 13 wherein the gasifier turbine blade root forms a second axial cavity with said gasifier turbine wheel, said second axial cavity communicating with the second annular cavity, and further wherein the gasifier turbine blades define a plurality of longitudinal bores in the airfoil portion, at least one of said longitudinal bores communicating with the second axial cavity.

* * * * *